United States Patent [19]

Yen

[11] Patent Number: 4,968,429
[45] Date of Patent: Nov. 6, 1990

[54] ANTI-CLOGGING METHOD FOR MAXIMAL FLUX AND PROLONGED FILTRATION TIME

[76] Inventor: Richard C. K. Yen, 4261 Chase Ave., Los Angeles, Calif. 90066

[21] Appl. No.: 456,972

[22] Filed: Dec. 26, 1989

Related U.S. Application Data

[62] Division of Ser. No. 407,360, Sep. 14, 1989, Pat. No. 4,921,603.

[51] Int. Cl.$^5$ .................... F01D 69/00; F01D 71/00
[52] U.S. Cl. .................... 210/637; 210/644; 210/652
[58] Field of Search .............. 210/767, 791, 634, 637, 210/641, 644, 649, 650, 651, 652

[56] References Cited

U.S. PATENT DOCUMENTS

4,579,662 4/1986 Jonsson .................... 210/637

Primary Examiner—Frank Sever
Attorney, Agent, or Firm—Thomas I. Rozsa

[57] ABSTRACT

A method for filtering a suspension including particulates and increasing the concentration of retainable matter wherein the suspension is drawn through the filter in a manner such that a portion of the suspension is subjected to a negative pressure which pulls it away from the filter membrane and permits it to pass through the filter unit without going through the membrane and a portion of the suspension is subjected to a positive pressure which causes it to pass through the filter membrane before exiting the filter unit, thereby creating a permeate. The invention involves regulation of flow rates to achieve a ratio of the pressures so that when some of the particulate matter from the portion of the suspension passing through the filter membrane becomes effective in decreasing flux, the negative pressure will serve to pull the particulate free and unclog the filter membrane on a continuous and automatic basis, thus allowing prolong filtration time with maximal flux.

8 Claims, 3 Drawing Sheets

ANTI-CLOGGING METHOD FOR MAXIMAL FLUX AND PROLONGED FILTRATION TIME

This application is a Divisional Application of co-pending application Ser. No. 07/407,360 filed on Sep. 14, 1989, now U.S. Pat. No. 4,921,603.

BACKGROUND OF THE INVENTION

1. Field of the Invention

The present invention relates to filtration systems. Filtration systems have conventionally been used for either (1) removal of particulate matters from fluid suspensions to result in clear, non-turbid fluids or, (2) removal and discarding of part of the soluble and fluid fraction for the purpose of concentrating the desirable particulate matters. To achieve the first purpose, the filter in the system is used to trap the particulate matters by virtue of the effective pore sizes being smaller than the particulate matters, while allowing the soluble fraction to go through the filter pores and collected for subsequent use. To achieve the second purpose, the ideal filter will allow the soluble fraction to go through the filter pores with only minimal entrapment of the particulate matters which are then returned to collection containers as the "retentate" fraction for subsequent use. In both procedures, clogging of the filter remains a major problem.

2. Description of the Prior Art

The clogging of filter pores is a major problem with prior art filtration and dialysis devices. Clogging of the filter pores quickly reduces the efficiency of the filtration system. As the number of unclogged pores diminishes, filtration rate decreases. Since flow rate is equal to pressure gradient divided by resistance, as more and more filter pores are clogged (increasing resistance), a progressively larger pressure gradient is needed to maintain adequate flow rates. Even then, when enough of the filter pores become clogged, flow rate will become for all practical purposes, zero. At that point, particulate matters can no longer be removed from fluid suspensions. In addition, if the purpose is to concentrate suspended particulate matters, clogging of filters will decrease the final yield of the particulate matters and may in fact decrease the concentration of such matters in the retentate.

To minimize the problem of clogging, various approaches have been designed, as reflected in different filtration systems on the market. One approach incorporates designs for vigorous stirring of the suspension physically above, or prior to interaction of the suspension with the filter surface. Examples include the Stirred Cells Series of Amicon Division, W. R. Grace & Co. However, such systems are ineffective because the distance between the stirring mechanism and the filter membrane (typically in millimeters) are several orders of magnitude larger than the diameter of the particles (typically in microns). Once the particulate matters are trapped within the filter pores, with constant positive filtration pressure pressing them against the filter membrane, agitation at a far distance (relative to the size of the particulate matters) will not effectively dislodge them. Moreover, high shearing forces generated by vigorous stirring may cause foaming and denaturation of the particulate matters.

Another approach involves the concept of tangential flow as exemplified by Millipore's Minitan system. Instead of applying pressure perpendicular to the surface of the filter, the suspension is pushed forward by positive pressure from a pump system so that it travels in a direction tangential to the filter surface. In theory, this design allows the particulate matters to travel in a direction tangential to the filter surface while the soluble phase goes through the filter pores in a direction perpendicular to the filter surface. In practice, however, substantial clogging still occurs. The reason is that the particulate matters are carried by the soluble phase of the suspension and will travel in the direction of the immediate fluid surrounding a given particle. Any time a fraction of the soluble phase goes through the filter pores (in a direction perpendicular to the filter surface), a proportional amount of particulate matters will travel with it in the same direction. Regardless of the direction of flow of the rest of the suspension bulk (which may travel in a direction tangential to the filter surface), the fraction that goes through the pores will clog up the pores. With this understanding, it becomes clear that tangential flow filter systems are only different ways of recirculating the bulk of the suspension before its interaction with the filter pores. This design does not substantially alter the clogging potentials of particulate matters at the level of the filter pores because the particulate matters are again pressed onto the pores by the positive pressure used to circulate the bulk of the suspension.

Since both the stirred cell design and the tangential flow systems use positive pressure to circulate the suspension, they both result in trapping of particulate matters within the matrix of the filter membrane. For this reason, these systems are not suitable for the purpose of concentrating particular matters. There exists a need for a novel design where: (1) the filter membrane will not be clogged, and (2) should unexpected change in the filtration condition lead to some clogging, the obstructed pores will become unclogged again. Such a device will allow efficient concentration of valuable particulate matters. In addition, because of the increased life span of the filter membrane, it also allows cost-efficient collection of the soluble phase of the suspension, if the soluble phase is the desirable fraction from the suspension.

In special filtration systems such as ultrafiltration for handling ultrafine particles suspended in a fluid phase, the filter membrane is often anisotropic, consisting of a thin skin supported by a porous backing. As such, the skin is the barrier which separates the retentate from the permeate and does not necessarily have microscopically visible pores. However, positive pressure forcing the fluid out from the retentate through the skin to become the permeate promotes the accumulation of particles next to the skin which impedes further improvement in filtration efficiency. This is known as the gel resistance. The greater the positive pressure to squeeze the fluid out of th skin, the greater is the gel resistance. When the filtration efficiency (defined as "flux" which is often in units of gallons of permeate obtained per square foot filter area per day, or GSFD) is plotted against transmembrane pressure (pressure difference between the retentate surface and the permeate surface of the filter), initially flux increases with increase in transmembrane pressure. Rententate surface is defined as that surface of the filter which faces the retentate or particulate suspension. The permeate surface is the other surface of the filter which faces the permeate or filtrate fluid. Particles are defined here as materials carried by the fluid phase to be separated by the filter membrane. Particles can therefore be in a dissolved state, or colloidal or solid state. However, after a certain transmembrance pressure is obtained, flux increases no more and becomes a constant value. This is due to the increase in resistance which builds up as transmembrane pressure is increased. Very often, due to the large particle sizes as compared to the sub-microscopic pore sizes of the skin, the filter is not described as being clogged, but is described technically as having resistance (e.g. gel resistance) that impedes further increase in flux. This technicality is recognized and will be included in this application as part of the "clogging" process since clogging is defined here as any process that decreases the filtration efficiency of the filtration system.

To overcome the problem of clogging, examples in the prior art include the following:

1. Pre-filters are used to pre-sieve large particles and to decrease the total load presented to the main filter. Pre-filters have, by necessity, pore sizes larger than the pore sizes of the main filters. This method does not prevent the clogging of either the main filter or the prefilter. This method is actually two filtration systems working in tandem or in sequence with all the classical problems associated with such systems. Once some pores become clogged, the number of pores available for filtration decreases and the particles are often trapped inside the filter matrix and not recirculated back to the retentate.

2. Tangential flow is an attempt to decrease the clogging of filter pores by introduction of a sweeping force tangential to the surface of the membrane instead of perpendicular to it to sweep away any clogging material. This is performed by pushing the fluid in a direction tangential to the membrane surface instead of directly onto it (perpendicularly to it). However, such systems inevitably use positive pressure to squeeze the fluid out of the filter. Positive pressure is defined here as pressure within the filtration system where particles are pushed onto the retentate surface of the filter. Positive pressure can be created by either a pump upstream from the filter system forcing the suspension onto the retentate surface to "squeeze" the fluid out as permeate, or by a vacuum system downstream from the permeate surface of the filter "sucking" the permeate out. To the extent that the fluid entering the pores is travelling in a direction perpendicular to the surface of the filter, the particles carried by that portion of the fluid will also travel in a direction perpendicular to the surface of the filter and therefore will clog the pores. The remaining portion of suspension (in fact the bulk of suspension) that does not interact with the pores of the filter will not clog the pores, and therefore it does not matter what direction it travels as far as clogging is concerned. Therefore, tangential flow is only a method of moving the bulk of suspension which has no immediate effect on clogging and does not solve the problem of clogging at the level of the pore sites.

3. Back flushing - many filtration systems are obligated to terminate the filtration process when the filtration efficiency drops below acceptable levels. Instead of discarding the expensive filters, a fresh fluid medium is forced from the permeate surface of the filter toward the retentate surface to back-flush out the material that clog the pores. This method has several disadvantages: (a) backflushing time means down-time for the filtration process; (b) back flushing is inefficient. Let us consider two clogged pores; pore X is 99% clogged and pore Y is only 10% clogged. At a given back-flushing pressure, pore Y is going to be unclogged first. After pore Y becomes unclogged, the backflushing fluid can go through pore Y with little resistance. Since fluids tend to travel in the pathway of least resistance, there is now even less pressure to unclog pore X once pore Y has been unclogged. Therefore, the pores that need most unclogging get the least unclogging pressure; (c) Since the particles are trapped during the filtration process, they do not recirculate back to the retentate. If the purpose of the filtration is to increase the concentration of the particles, trapping of the particles within the matrix of the filter defeats that purpose; d) Some particles are pressure-sensitive. Continued impaction within the pores of the filter may irreversibly damage particles.

The present inventor, Dr. Richard C. K. Yen has filed two presently co-pending patent applications concerning filtration systems. They are as follows:

1. U.S. patent application Ser. No. 07/292,991 filed 01/03/89 entitled "Anti-Clogging And Dialysis Device For Filtration Systems".

2. U.S. patent application Ser. No. 07/311,345 filed 02/16/89 entitled "Vacuum Suction Type Anti-Clogging And Dialysis Device For Filtration Systems".

The anti-clogging devices described in the co-pending applications utilize a negative pressure that constantly unclogs any pores that are about to clog while filtration goes on. Negative pressure is defined here as any pressure in the filtration system that promotes movement of particles away from the retention surface of the filter. This can be achieved by either a pump downstream from the retentate surface of the filter "pulling" the particles away from the retentate surface of the filter, or a pump pushing fluid from the permeate surface of the filter toward the retentate surface.

These prior art applications have several distinguishing features: (a) the anti-clogging process is an on-going continuous process. It is not a two step approach of conventional filtration to be followed by back-flush; (b) the anti-clogging process is efficient. It has the greatest anti-clogging potential where clogging is most likely to occur in the filtration system; (c) anti-clogging method can be used on particles that are pressure-sensitive because the pores do not trap the particles; (d) all the pores are continuous being cleansed and therefore the filter has the maximal number of functional pores and can achieve the maximal filtration efficiency at all times.

It was stated in the pending applications that volume-regulated pumps are preferred. This is to ensure that whatever pressure that the pump generates to either recirculate the retentate or to extract the permeate, some constant flow of either permeate or retentate can be measured and has values greater than zero. A discussion of the ratio of recirculation flow rate versus permeate (filtrate) extraction rate recognized that for different suspensions, this ratio may vary. It was emphasized that the flow rate of the retentate must be greater than the flow rate of permeate extracted from the suspension in order to generate a negative pressure always greater than the positive pressure pushing the particles against the retentate surface of the filter. The present invention involves an improvement of this process to modify the principles disclosed and claimed in the copending applications for use with other types of suspensions.

SUMMARY OF THE PRESENT INVENTION

To minimize the problem of clogging and to achieve undiminishing filtration rates and to concentrate the desirable retainable material, the present invention anti-clogging device has the following essential features:

1. Instead of using positive pressure to push the suspension onto the rentante surface of the filter (whether the bulk of suspension travels in a direction perpendicular to or tangential to the surface of the filter), this device employs a negative pressure to pull the suspension away from the retentate surface of the filter membrane. The definition of positive pressure is hereby defined as pressure forcing the suspension toward the retentate surface of the filter. The retentate surface is that surface of the filter which faces the suspension and retentate, and which faces away from the filtrate or permeate. By this definition, conventional filtration systems using a negative suction from a vacuum source downstream from the filter unit in fact also applies a positive pressure on the particulate matters onto the filter retentate surface. The present invention, by contrast, is truly anti-clogging and is novel because it is designed to actually pull particulate matters away from the retentate surface of the filters.

2. The forces of negative pressure applied on the particulate matters pulling them away from the retentate surface of the filter will be the greatest in locations within the filtration system where such particulate matters are most likely to clog the filter.

3. While most of the filtration units on the market depend on positive pressure generated by pump systems to deliver the suspensions to the filter unit, some smaller filter units use a vacuum source to pull the suspension onto the retention surface which is still a positive pressure onto the filter membrane to thereby cause clogging. One example of such a vacuum - operated filter unit is the Sterifil-D Filter Units (Millipore) comprising a two-compartment reservoir, separated by a filter membrane from the bottom (filtrate-collection) compartment. The vacuum initially generated by the vacuum source via an outlet on the bottom compartment creates a positive pressure on the retentate surface of the filter membrane through which the filtrate is drawn from the suspension in the top compartment.

In contrast, the present invention incorporates a novel design to be used in conjunction with a vacuum source to thereby create a source of negative pressure on the retentate surface of the filter membrane, which will pull the particulate matter away from the filter retentate surface. We define here as particulate matter any particles that are too large to pass through the filter pores and have the potential of clogging the filter membrane. Therefore, by this definition, particles can be macroscopically visible solids, or microscopically invisible dissolved molecules (e.g. protein macro molecules) which can clog up specially designed molecular-sieving filter membranes.

It has been discovered, according to the present invention, that the creation of a source of negative pressure in a direction opposite to the direction of flow of the filtrate creates a force to pull particulate matter away from the filter membrane rather than push it into the filter membrane, thereby providing an anti-clogging device which assures that the filter will have a long and useful life.

It has additionally been discovered, according to the present invention, that for suspensions that are viscous or have particles that clog the pores easily or are pressure sensitive, the flow of retentate should always be greater than the flow of permeate extracted from the suspension in order to generate a negative pressure sufficiently great to unclog the system while at the same time allowing filtration to continue.

It has further been discovered, according to the present invention, that the most efficient filtration system is the one with the maximal flux and which can maintain that flux for the longest time. In technical terms, when the flux (GSFD) is plotted against longevity of the process, the system with the largest "area under the curve" is the best filtration system. Longevity of filtration can be expressed in a variety of ways: time of filtration, absolute amount of permeate extracted, volume of permeate extracted as a percentage of initial suspension volume, or increase in the percent solid left in the retentate. In other words, a filtration system with a very high flux (e.g. by using very high transmembrance pressure) which diminishes quickly due to clogging will be less efficient overall than another filtration system where the initial flux may be only half the value of the first filtration system but can maintain that flux value for more than twice the time of the first filtration system. It is therefore an objective of this present invention to achieve the best "area under the curve" using the present inventor's anti-clogging method.

The present inventor's previous co-pending patent applications primarily concerned how to prevent the particles in suspension from clogging the pores. The methodologies disclosed described how to maximally avoid clogging by the particles in the suspension. In contrast, this invention concerns the fluid phase of the suspension, on how to obtain the combined maximum from the maximal flux with the longest time possible with that flux value, to achieve the best filtration efficiency consistent with an anti-clogging condition.

It has been discovered that several mechanisms contribute to a lower flux than optimal for a filtration system. (1) Inadequate transmembrane pressure. When a new filter is used, all of the pores are open and so clogging is not yet a problem. Flux is determined by the amount of transmembrane pressure. Since the permeate is flowing from the retentate surface towards the permeate surface, by definition, the transmembrane pressure must be positive pressure. If the transmembrane pressure is negative, the fluid will flow from the permeate surface toward the retentate surface. Under such conditions of positive pressure, the higher the transmembrane pressure the larger the flux. If an inadequate transmembrane pressure is used, less than maximal flux will result. (2) Soon after the start of filtration, clogging becomes a problem. As defined above, the higher the transmembrane pressure, the faster resistance builds up (including clogging and gel resistance). After a certain point, resistance in the system will oppose further increase in flux. This equilibrium point presents the maximal flux obtainable with a given type of filter filtering a given type of suspension. Soon after the start of the filtration, some pores will become unavailable for filtration due to clogging, resulting in a decrease in flux. Additional transmembrance pressure will not be effective because it is a problem of decreased effective filtration area of the filter.

In the present inventor's anti-clogging method, the problem present in item (2) directly above may not be a problem since Dr. Yen's method is designed to maximally prevent clogging. However, it has been discovered that a different mechanism can contribute to a lower flux than optimal. When the flow rate of the retentate is set at a value higher than optimal, the pump downstream from the filter unit can "pull" the suspension with enough force to overcome the other pump extracting the permeate from the suspension. Dr. Yen's previous disclosure set the condition that permeate extraction rate is always above zero (filtration process going on) while still maximally preventing clogging. It is an objective of the present invention to disclose the importance of an optimal retentate recirculation rate compared to permeate extraction rate to obtain optimal flux value. Too high a recirculation rate will generate a negative pressure too competitive for the fluid phase (in addition to the anti-clogging effect on the particles suspended in the fluid phase) resulting in preferential exit of the fluid at the retentate port as compared to exit at the permeate port and therefore results in lower flux than optimal.

It has further been discovered, according to the present invention, that for suspensions that have low solid contents, or have particles that will clog the filter but do so only lightly and easily retrievable from the pores, or particles that are hard or pressure-resistant, the flow rate of permeate (filtrate) can exceed the flow rate of the retentate (or retentate recirculation rate). The optimal ratio of retentate recirculation rate versus permeate retraction rate depends on various factors including the nature of the filter material (sticky or not), the particle sizes, the pore sizes of the filter, the initial percentage of solid material in the suspension, the maximum percentage of solid that can be tolerated before the retentate becomes too thick for recirculation, etc.

It has additionally been discovered, according to the present invention, that when the permeate/retentate flow rate ratio is higher than optimal, clogging will be a problem leading to a decrease in flux. This can be verified by the fact that an increase in the permeate/retentate flow rate ratio will further decrease the flux but that a decrease in that ratio will increase the flux.

It has additionally been discovered, according to the present invention, that when the permeate/retentate flow rate ratio is lower than optimal, competition of fluid by the retentate recirculation pump will be a problem also leading to a decrease in flux. This can be verified by the fact that an increase in the permeate/retentate flow rate ratio will improve the flux but that a decrease in that ratio will decrease the flux.

Therefore, it is recommended that the following steps be followed: (1) After the filter unit has been primed with an appropriate fluid, turn on the recirculation pump (flow rate regulated) at the lowest flow rate that can start the retentate recirculation process. If the pump is not flow rate regulated but pressure regulated, use the lower pressure sufficient to recirculate the suspension. (2) Set the permeate extraction pump at a flow rate setting (if flow rate regulated) or pressure setting (if pressure ergulated) which will generate an acceptable flux; start the filtration by turning on the permeate pump. (3) Then turn up the recirculation pump to gradually increase the recirculation rate until a decrease flux is observed. If step 2 has already led to some kind of clogging within a short time, increasing the recirculation rate of the retentate will improve the flux. In that case, continue to step up that recirculating rate until the maximal flux is reached. (4) Maintain the optimal ratio of permeate/retentate flow rate until such a time the flux drops again. Then repeat steps 2 and 3 with larger flow rates or pressure settings. The reasons for a different optimal ratio are varied but mostly related to the increased percentage of solids that are now concentrated in the retentate. With increased potential of clogging, the retentate flow rate must be increased to decrease that problem and a commensurate permeate extraction rate must be arrived at to obtain maximal flux value again.

It has also been discovered, according to the present invention, that for a given suspension containing a certain percentage of solid, the maximal flux may be obtained by a permeate extraction rate setting of P gallons per unit time with the permeate extraction pump and a retentate recirculation rate setting of R gallons per unit time with the retentate recirculation pump. If these pumps are pressure regulated and not flow-rate regulated, whatever pressure setting with the permeate extraction pump to produce a permeate extraction rate of P gallons per unit time and whatever pressure setting with the retentate recirculation pump to produce a retentatcate recirculation rate of R gallons per unit time will produce similar results. The same ratio of respective flow rate settings can be maintained also by proportionally increasing both rate settings, e.g. by using approximately 2P permeate extraction rate setting and simultaneously a retentate recirculation rate setting of approximately 2R. The advantage of using 2P/2R instead of P/R is that the former rate settings will have a greater anti-clogging potential even though the flux of the system is similar to using P/R. This is because the tangential vector that carried the unclogged particles away from the previously clogged partially clogged pore has now been increased. This arrangement differs from the classical tangential flow in that the classical tangential flow uses positive pressure which provides gel resistance formation. The present invention system incorporates a tangential vector but it uses negative pressures which promotes dispersal of any gel resistance. The tangential force merely sweeps any loose material away from the surface of the filter membrane. The limitation to unnecessarily high flow rates includes the wear and tear of the pumps at high rates and electrical and maintenance costs.

It is therefore an object of the present invention to provide an apparatus and method whereby a suspension comprising particulate matter can be filtered to either remove the particulate or to remove filtrate and increase the concentration of particulate matter in the remaining retentate in a manner in which the filter will not become clogged with particulate matter.

It is another object of the present invention to provide an apparatus and method whereby maximum flexibility is assured so that the recirculation process can be performed at different rates from the filtrate extraction process.

It is a further object of the present invention to provide an adjustable system wherein the recirculation and permeate extraction rate can be adjusted to that the maximum flux is achieved to keep the filter clean and to adjust the rates to conform to the type of suspension being filtered.

Further novel features and other objects of the present invention will become apparent from the following detailed description, discussion and the appended claims, taken in conjunction with the drawings.

DRAWING SUMMARY

Referring to the drawings for the purpose of illustration only and not limitation, there is illustrated:

FIG. 7 a. b. and c. are charts illustrating the dynamic nature of the present invention anti-clogging device.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
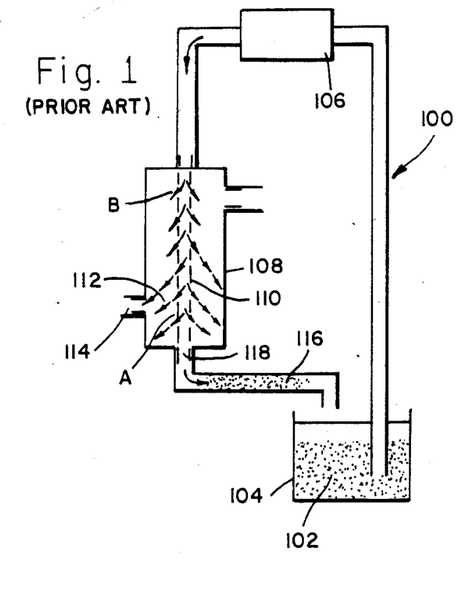
FIG. 1 is a schematic flow diagram of prior art filtration systems in a vertical orientation, illustrating the direction of flow of both the suspension and the filtrate.
Figure 2:
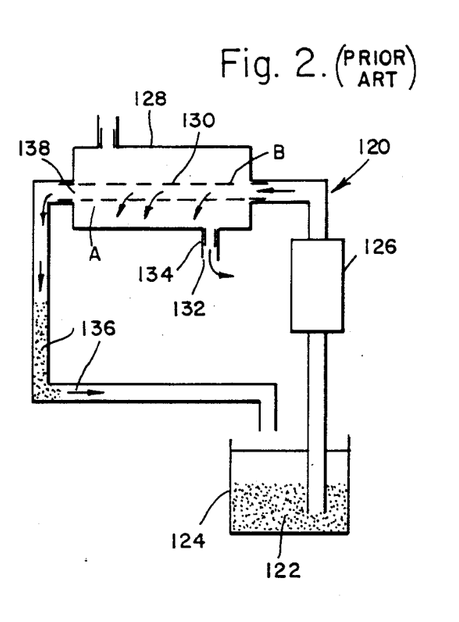
FIG. 2 is a schematic flow diagram of prior art filtration systems in a horizontal orientation, illustrating the direction of flow of both the suspension and the filtrate.

Referring to FIGS. 1 and 2, there is illustrated the direction of flow of both the suspension and the filtrate in conventional arrangements of filter units, in a vertical position, and in a horizontal position, respectively. In FIG. 1, the vertical flow filter arrangement 100 illustrates the suspension 102 located in suspension holding tank 104. The pump 106 is located upstream of filter unit 108 and its filter membrane 110. The pump 106 sucks suspension 102 out of suspension holding tank 104 and pushes it with positive pressure toward filter unit 108 and onto filter membrane 110. The filtrate 112 exits opening 114 of filter unit 108 while the retentate 116 exits the filter unit at its bottom outlet opening 118 and flows back into the suspension holding tank 104. In FIG. 2, the horizontal flow filter arrangement 120 illustrates the suspension 122 located in suspension holding tank 124. The pump 126 is located upstream of filter unit 128 and its filtration membrane 130. The pump 126 sucks suspension 122 out of suspension holding tank 124 and pushes it with positive pressure toward filter unit 128 and onto filtration membrane 130. The filtrate 132 exits opening 134 of filter unit 128 while the retentate 136 exits the filter unit at its remote exit opening 138 and flows back into the suspension holding tank 124. Examination of each of the filter units after filtration of a suspension will show that most clogging of the hollow fiber filters occurs at location A which is near the outlet of the filter unit, and much less at location B which is near the inlet of the filter unit. This is because there is a pressure gradient from the inlet of the filter unit to the outlet of the same unit. Therefore, the amount of clogging is not uniform within the filter unit. What is common to both units is the fact that the filter membranes (110 and 130) become clogged with the particulate matter because the suspension is pushed with positive pressure onto the filter membrane (110 and 130 respectively) by the pump which is located upstream of the filter.

Figure 3:
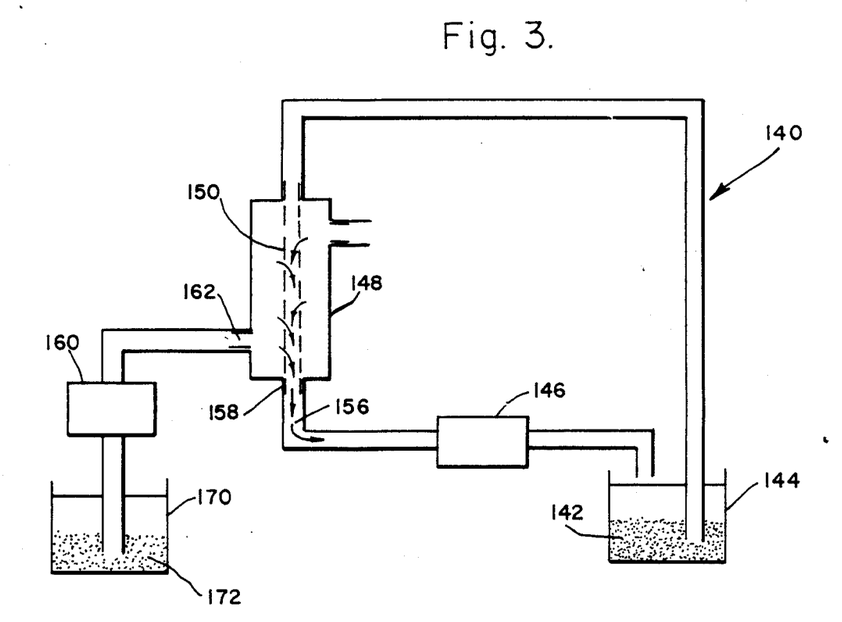
FIG. 3 is a schematic flow diagram illustrating a key principle of the present invention, namely having the pump downstream from the filter unit, drawing the suspension through the filter unit with a negative pressure with respect to the retentate surface of the filter membrane.

A key principle of the present invention is illustrated in the schematic flow diagram of FIG. 3. The flow filter arrangement 140 illustrates the suspension 142 located in suspension holding tank 144. The pump 146 is located downstream of filter 148 and its filter membrane 150. The pump 146 sucks suspension 142 out of suspension holding tank 144 and causes it to flow through filter unit 148 but pulling the retentate 156 away from the filter membrane 150. The retentate 156 exits the filter unit at its remote opening 158 and is pulled away from the filter unit 148 by the pump 146 which then causes the retentate to flow back into tank 144. FIG. 3 illustrates the importance of having the pump downstream from the filter unit. With the jacket filled with suspensions of a different color, it can be easily demonstrated that the flow of fluid from the jacket into the center of the hollow filter fibers is such that particulate matters from the suspension will be swept away from the retentate surface 150 of the filter 148.

Referring further to FIG. 3, a second pump 160 extracts filtrate or permeate 172 through a side opening 162 in the filter unit wall. The filtrate 172 is collected in filtrate tank 170. The extraction of filtrate 172 creates a positive pressure on the filter membrane 150 which would tend to clog it. However, a key principal of the present invention is that the pressure created from pump 146 is adjusted relative to the pressure created from pump 160 so that there is sufficient negative pressure to unclog the filter membrane 150 while at the same time allowing a sufficient amount of filtrate 172 to pass through the pores of the filter membrane 150. Overall, there is a net negative pressure to keep the filter membrane 150 unclogged but not so great that all of the fluid is pulled by pump 146 without some of the fluid being pulled by pump 160.

Figure 4:
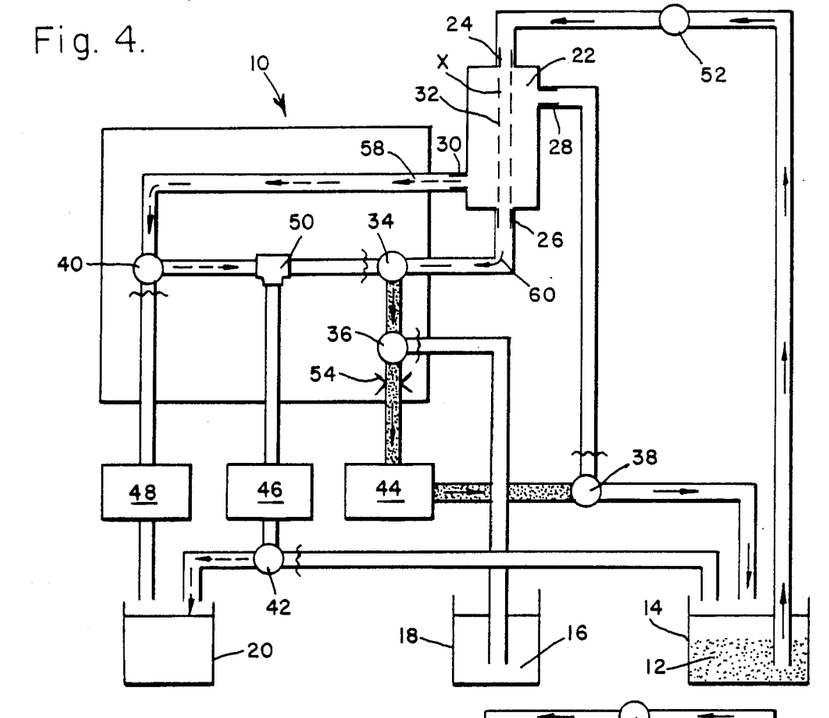
FIG. 4 is a schematic flow diagram of the present invention anti-clogging and dialysis device for filtration systems, illustrating the off-positions of all three-way valves during the volume reduction cycle.
Figure 5:
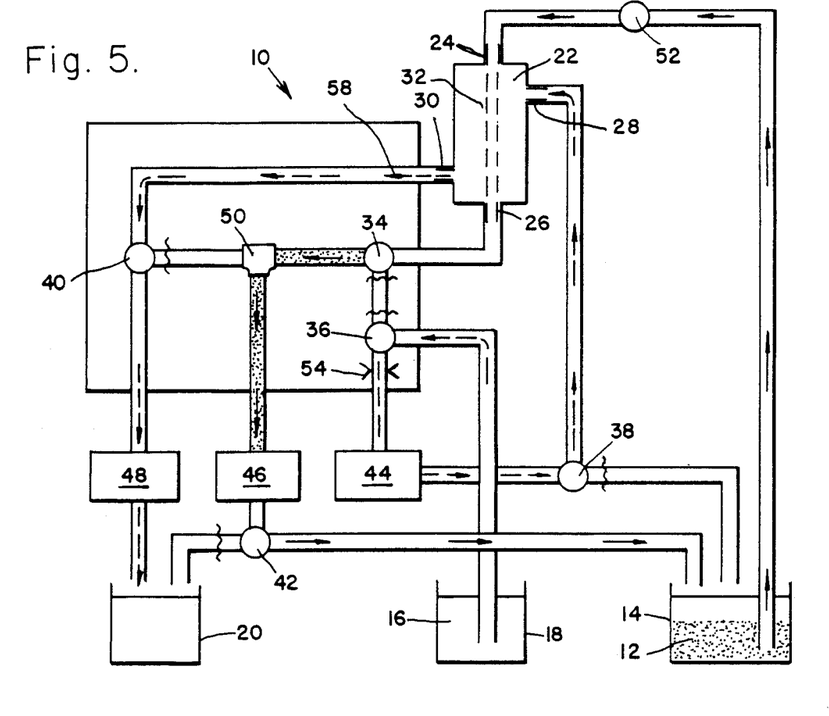
FIG. 5 is a schematic flow diagram of the present invention anti-clogging and dialysis device for filtration systems, illustrating the off-positions of all three-way valves during the wash-dialysis cycle.

The principles of the present invention are illustrated in a valve arrangement shown in FIGS. 4 and 5 which shown the adjustable negative pressure concept in one type of use. FIGS. 4 and 5 show the arrangement of various components including 3 pumps (two of which are principally used), a filter unit, containers for the suspension to be concentrated or dialyzed, and rinsing or dialysis buffer. There are at least 5 three-way valves, one three-way connection and one one-way valve in the design.

Of primary importance is the fact that the circulation pump (the one circulating the bulk of the suspension between the container and the filter unit) operates down-stream from the filter unit so that fluid is drawn by negative pressure from the outlet of the filter unit. This is in contrast to most conventional filter units where the pump is up-stream from the filter unit, pushing the suspension toward the inlet of the filter unit.

The present invention anti-clogging and dialysis device for filtration systems 10 comprises a suspension 12 inside a suspension holding tank 14, a dialysis fluid 16 inside a dialysis fluid holding tank 18, and a filtrate or waste disposal tank 20. The device 10 further comprises a filter unit 22 having inlet opening 24, exit opening 26, first wall opening 28, second wall opening 30 and internal filter membrane 32. The device 10 further comprises five valves, first valve 34, second valve 36, third valve 38, fourth valve and fifth valve 42. The device 10 also comprises three pumps, first pump 44, second pump 46 and third pump 48. A T-connection 50 joins first valve 34, fourth valve 40 and second pump 46. A one way valve 52 is located between suspension tank 14 and filter unit 22. An adjustable clamp 54 is located between second valve 36 and first pump 44.

FIG. 4 illustrates the off-positions of all three-way valves (34, 36, 38, 40 and 42) during the Volume Reduction (VR) cycle. The flow pathway of the retentate 60 is separate from the flow pathway of filtrate 58. During this cycle, first pump 44 serves the purpose of a circulation pump, pumping the suspension 12 between the container and the filter unit. First pump 44 should ideally be rate-regulated. Second pump 46 is also downstream from the filter unit 22 and serves to extract filtrate 58 from the suspension 12. Second pump 46 ideally should be rate-regulated so as to extract a constant amount of filtrate. Second pump 46 should ideally be connected to the filtrate port 30 which is closest to the outlet 26 of the filter unit 22. The filtrate extraction rate, i.e. amount of filtrate 58 extracted per unit time from the filter unit, is usually less than the re-circulation rate, i.e. amount of retentate 60 leaving the filter unit 22 per unit time. In this embodiment, third pump 48 is turned off and the flow paths are as follows. First pump 44 sucks suspension 12 out of the suspension holding tank 14 and causes it to go through filter unit 22, entering through entrance 24 and being pulled inwardly away from filter membrane 32 (as illustrated in FIG. 3) and out exit opening 26, through first valve 34, second valve 36, through first pump 44, through third valve 38 and back into suspension holding tank 14. Second pump 46 sucks the filtrate 58 out lower portion or second sidewall opening 30, through fourth valve 40, through T-section 50, through second pump 46, through fifth valve 42 and into waste disposal tank 20.

The design of this device is such that the recirculation rate is preferably greater than the filtrate extraction rate to insure that particulate matters do not clog the filter pores. Depending on the nature of the suspension being filtered, as discussed below, the filtrate extraction force may sometimes be greater than the recirculation force. The reason for such an arrangement is to make certain that the overall negative pressure pulling particulate matters away from filter pores 32 is always greater than the overall positive pressures pressing the particulate matters against the pores to clog them.

The ratio of the recirculation rate to the filtrate extraction rate, however, is affected by a number of factors. For example, a filter unit placed in a vertical position will have the gravitational force facilitating the flow of retentate in a vertically down direction (such as in FIG. 4), naturally unclogging particles from the retention surface of the filter membrane. Therefore, even for a slow recirculation rate of about 10 cc/min, there is enough negative force unclogging the filter, that the filter membrane will not be clogged when a filtration extraction rate of 8 cc/min is applied. However, when the filter unit is placed in a horizontal position gravitational force tends to work in such a way that particulate matter will settle down inside the hollow filter fibers, creating a condition favorable to clogging. Therefore, a greater negative pressure is needed to unclog the filter membrane, e.g. by using at least a recirculation rate of 20 cc/min when an 8 cc/min filtration extraction rate is desired. Other factors will include viscosity of the fluid phase and how easy it is for the fluid to pass through the filter pores. Lower viscosity of the fluid and larger pore size will facilitate exit of the fluid with minimal positive pressure, thus allowing a higher filtrate extraction rate or flux. The pore size in the filter membrane compared to the particulate size will also affect the optimal filtrate extraction rate vs the recirculation rate. If the particulate matters are much larger than the pore size, which means they do not clog easily anyway, a higher filtrate extraction rate again can be tolerated without proportionally increasing recirculation rate to increase the negative unclogging pressure. This design is truly an anti-clogging device because after the overall adjustment of the system, negative pressures on particulate matters are designed to be moving them away from any part of the filter rententate surfaces while positive pressures move the fluid phase of the suspension through the filter pores as permeate.

Even during temporary disequilibrium of pressures at a given location along the filter fibers, the device is designed to unclog obstructed filter pores. The causes of pressure disequilibrium are many, but primarily because there are pressure gradients along different parts of the filter. Consider the simple case of any single filter pore, X, located at any part of the hollow filter fiber inside the filter unit. Temporary disequilibrium of pressure may cause the positive pressure at X to exceed that of the negative pressure created by the pulling force of the recirculation pump. The resultant net positive pressure will cause pore X to be temporarily clogged. Once pore X is clogged, the positive pressure created by the filtrate pump will decrease at X to zero, because flow rate there becomes zero. (Flow rate is equal to pressure divided by resistance. When X is obstructed, resistance at X becomes infinitely large and so the pressure in the direction of the flow of fluid becomes zero). Since the negative pressure at X created by the pulling force of the recirculation pump remains unchanged, a decrease of positive pressure at X to zero will allow an increasingly larger net negative pressure to unclog again the particulate matters temporarily obstructing X.

FIG. 5 illustrates the off-positions of all three-way valves during the Wash-Dialysis (W) cycle. During this cycle, second pump 46 serves as the circulation pump. First pump 44, which has a faster rate, will push a relatively large amount of dialysis buffer 16 across the filter unit to bathe the filter fibers and by diffusion, to change the composition of the soluble phase of the suspension. If it is not desirable to change the composition of the soluble phase of this suspension, a fresh medium similar in composition to the permeate can be used. The purpose of such an infusion will be mainly to augment the negative pressures at locations of the filter membrane near to the inlet 24 of the filter unit. Third pump 48 will be set at a rate at least equal to that of first pump 44, for the purpose of extracting the used dialysis fluid out of the filter unit at the same rate so that excess dialysis fluid will not exit the filter outlet 26 to flood the retentate and thus lower the concentration of the washed particulate matters. If it is desirable to perform both volume reduction as well as dialysis function at the same time, third pump 48 can be set at a rate slightly larger than that of first pump 44. When the rates are thus set, the volume of dialysis fluid extracted from the filter unit per unit time will be greater than the amount delivered. The difference must have come from the soluble phase of the suspension, thus reducing the volume of the recirculated suspension. Again, the difference between the rate of first pump 44 (dialysis fluid delivery) and third pump 48 (filtrate extraction rate), defined as volume reduction rate, is usually less than the retentate recirculation rate. Otherwise, the positive pressure generated by the net extraction of the soluble phase may be excessive compared to the negative pressure generated by the recirculation pump 46, leading to clogging of the filter. However, as discussed above, certain suspensions will allow volume reduction rate to be greater than the retentate recirculation rate. Volume reduction rate in the absence of dialysis fluid delivery is identical to permeate or filtrate extraction rate.

Of importance is the presence of the one-way valve 52 so placed that large amounts of dialysis buffer 16 will not back-flow into the suspension container and so increase the total volume (thus reducing the concentration of suspended particulate matters).

If a filter 22 has more than one filtrate port, the one farthest away from the outlet of the filter unit ( first opening 28) should be used for infusion of dialysis fluid. In contrast, the filtrate port closest to the filter outlet (second opening 30) should be used for filtrate exit. If the wrong connections are made, such as using opening 30 for infusion and opening 28 for exit of dialysis fluid, dialysis fluid will preferentially exit from the filter outlet 26 instead of opening 28. This is because the filter pores near the filter unit outlet port will experience the greatest negative pressure from the recirculating pump. In addition, the direction of flow of the dialysis fluid, when infused at second opening 30 under pressure, will also create a negative pressure (with respect to the retentate surface 32 of the filter 22, which in the hollow fibers is the surface facing interior) at the pores near the filter outlet. Dialysis fluid will therefore enter into the interior of the hollow filter filters. Thus the combined greater increased negative pressure will draw the dialysis fluid (in addition to the suspension) out of the filter unit. When this happens, the retentate 60 will be diluted.

Another disadvantage of the wrong connection is that the pores near the filter inlet 24 will be clogged. The reason for the clogging is that the negative pressure generated by the recirculating pump is weakest at the pores near the filter inlet. In addition, part of the dialysis fluid, which had entered into the interior of the hollow fibers from pressure at opening 30, is now drawn toward opening 28 by the pulling of third pump 48. The direction of flow of fluid, from the interior of the fibers outwards, is positive with respect to the retention surface there. Therefore, for the pores near the filter inlet 24, the net pressure is greatly positive and thus tends to push the particulate matters onto the pores to clog them.

However, if the connections are properly arranged, such as in FIG. 5, with infusion of dialysis fluid through opening 28, and fluid extraction at opening 30, the design is at optimal condition for washing, or the combined function of volume reduction and washing. The direction of flow of dialysis fluid will be con-current with the flow of the suspension inside the hollow fibers. The pressure generated by second pump 46 is such that it creates a large negative pressure on the filter pores near the filter outlet 26 which will counter the pulling force of third pump 48 which generates a positive pressure (again with respect to the retention surface 32) on the filter membrane. The negative pressure generated by pump 46 on the filter pores near the filter inlet 24 is not as great as that near the outlet 26, but the negative pressure is augmented by the negative pressure generated (again with respect to retentate surface 32) by first pump 44. Again, to insure that the negative pressure is adequate for anti-clogging as compared to the positive pressure near outlet 26, the difference between first pump 44 and third pump 48 (filtrate extraction rate) or the volume reduction rate preferably should be remain less than that of the retentate recirculating pump.

In practice, the outer jacket of the filter unit should be completely primed with a suitable fluid (e.g. dialysis fluid) before all the pumps are turned on; especially the filtrate pump to extract the filtrate. This will insure that pressure is evenly distributed within the filter unit and that filtrate is extracted from the entire columns of filter fibers and not just from the portions of filter fibers near the outlet of the filter unit. The mechanism for priming the filter unit depends on the design of the filter unit. Some units are marketed with primary fluid inside the jacket (e.g. Curesis Plasma Separator). For those that come without a suitable priming fluid, pump 44 can deliver the dialysis fluid to the jacket until it is filled up from the bottom to the top. During priming, pump 46, 48 will be turned off and the one way valve 52 turned in a reverse direction to allow air to escape the filter unit until all tubings are completely primed. Then valve 52 will be turned back to its normal direction and the rest of the pumps set at their desirable pump rates, will be turned on for either the VR or W, or VR and W cycle.

Although presented conceptually here as separate "pump systems" such as first pump 44, second pump 46 and third pump 48, in practice a single pump with two heads can be used to combine the function of the first pump 44 and third pump 48 presented here; with a separate second pump 46 to be used nearby. An even more sophisticated pump with different gear ratios can also be employed to do the work of all three pumps, pulling the retentate 60 and the filtrate 58 at the desired ratio of recirculation to filtrate extraction flow rates.

In practice, an adjustable clamp 54 can be placed between valve 36 and valve 38 as illustrated in FIG. 5, so that slight compression of the dialysis fluid infusion tubing will decrease the rate of delivery to opening 28 as compared to extraction of fluid from opening 30. Such an arrangement will permit a single pump with a dual-head to have one pump speed and yet deliver less fluid to opening 28 than extraction of fluid from opening 30, to achieve simultaneous volume reduction and wash-dialysis (VR+W) functions.

Figures 6, 7:
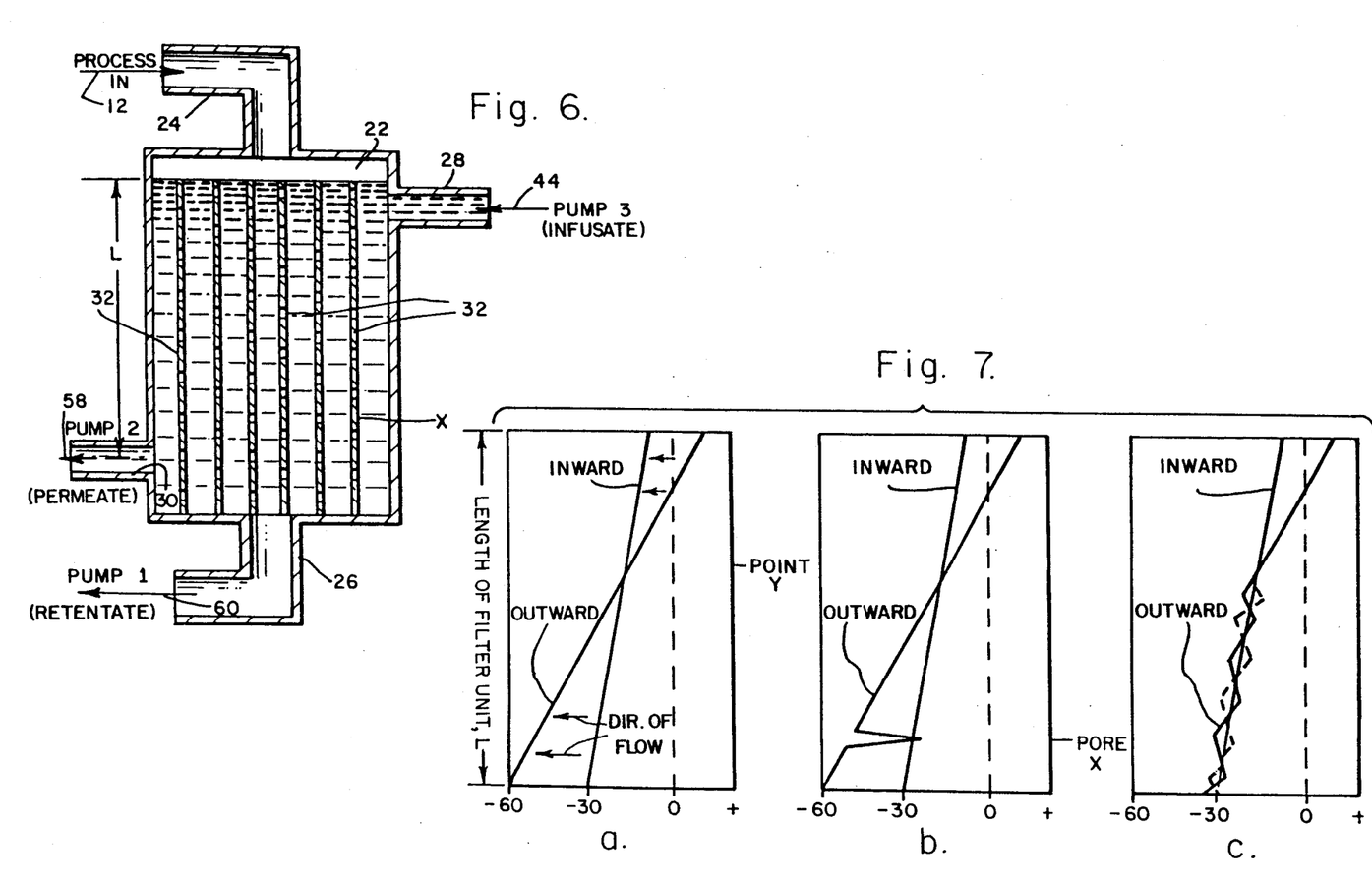
FIG. 6 is an enlarged view of the filter used with the present invention principles as positioned in FIGS. 4 and 5.

The present invention concept will now be described in detail. FIG. 6 is a filter unit comparable to the filter units in FIGS. 4 and 5, but shown in much greater detail. The essential features of the anti-clogging principle as applied to hollow fibers ultrafiltration systems will now be described. Pump 1 (comparable to pump 44 in FIGS. 4 and 5) is the pump which is used to pull the suspension 12 through the filter cartridge 22 and then recirculate the retentate 60 back to the suspension container 14. The direction of flow of the suspension 12 within the cartridge is essentially vertically down. The membrane pressure created is negative inside the hollow fibers and tends to move particles or other resistance materials away from the retentate surface of the filters 32. Pump 2, comparable to pump 46 in FIGS. 4 and 5 is used to pull the permeate through the hollow fiber filters 32. Even though pump 2 generates a "pulling" force, it tends to impact particulate matters onto the retentate surface (in this case the interior surface) of the filter 32 and therefore exerts a competing positive membrane pressure. In a cartridge with two permeate exit ports, the lower one 30 should be connected to pump 2. Such an arrangement will allow the maximal positive membrane pressure experienced by any filter fiber (such as that created by pump 2 at the lower portions of the cartridge) to be overcome by an appropriately matched negative membrane pressure at the same site. In this arrangement, the negative pressure created by pump 1 is greatest at the lower portions of the cartridge. The key to success of the anti-clogging system is to match the greatest negative pressures to sites where the greatest positive pressures are expected in the system, to constantly keep the filters unobstructed.

Pump 3 is optional, but it is useful for the dialysis of the suspension 12, or the addition of other soluble material, if desirable, to the suspension at the same time the permeate 58 is extracted from the unit. The rate of infusion by pump 3 can be greater than, equal to or less than the rate at which the permeate leaves the permeate exit port, depending on the purpose of the experiment. Even if there is no need to change the composition of the soluble fraction of the suspension, pump 3 can be used to augment the anti-clogging function of pump 1 by infusion of a solution similar in composition to that of the permeate. Pump 3 should be connected to the upper side-port 28 so that the flow of infusate is concurrent (and not countercurrent) to the flow of the suspension inside the hollow fibers. The negative membrane pressure generated by pump 1 is the weakest at the upper portions of the filter fibers. Under optimal conditions, such negative membrane pressure may still be able to overcome the positive membrane pressure generated by pump 2 that tends to promote clogging or gel-layer formation. Under non-ideal conditions where the positive membrane pressure created by pump 2 is excessive compared to the negative membrane pressure generated by pump 1, such as can occur in the upper portions of the filter fibers, leading to excessive clogging there, pump 3 can be used to augment the negative membrane pressures. Even though pump 3 pushes fluids into the cartridge, it actually creates a negative membrane pressure at the upper portions of the filter fibers because the fluids tend to move from outside the fibers inwards and thus tend to unclog resistance materials from the "pores" situated there. If pump 3 is not in use, the upper side-port 28 should be closed and the negative pressure of pump 1 alone must be great enough to provide anti-clogging negative pressures for the entire length of the fiber from bottom to top.

Several flow rates are characteristic of the anti-clogging pressure arrangements. Volume reduction rate is equal to permeate outflow rate minus infusate inflow rate. Therefore volume reduction rate is identical to permeate outflow rate if infusate inflow rate is zero. Depending upon the amount of solid material in the suspension, retentate recirculation rate is often greater than volume reduction rate to prevent gel-layer formation. The ratio of retentate recirculation rate to volume reduction rate is a reflection of the overall negative membrane pressure over the overall positive membrane pressure along the length of the fibers. For viscous material, we expect that this ratio is high.

While it is more practical to describe the present disclosure with fluid flow rates, the present invention can also be illustrated by diagrams using pressure gradients. While not adhering to any particular scientific theories, the mechanism with which the present invention works can be described as follows: FIG. 7 explains the dynamic nature of such an anti-clogging device. FIG. 7-A describes the initial condition as pump 1 is first turned on and then pump 2 is turned on. For the sake of illustration, the interior pressure at the bottom of a filter fiber is depicted as −30 psi. Since it tends to pull particles away from the retention surface of the fiber, it creates a negative membrane pressure there. Let us start with a pump 2 setting such that pump 2 pulls at an excessively high pressure (or flow rate) e.g. −60 psi. As defined above, pump 2 creates a positive membrane pressure which tends to promote gel-layer formation or impaction of particulate matters onto the retention surface of the filter. Pump 3 is arranged so that it will push fluids into the cartridge by positive (e.g. +5) psi. In this condition, the fluids will flow from outside the fibers into the interior of the fibers at the upper portion of the fibers such as above point Y (approximately the upper 2/5 of the length of the filter unit), but the permeate will flow outwards from the interior of the fibers at the lower portions of the fibers, such as below point Y.

As more permeate is extracted and the concentration of solid materials in the suspension builds up, the gel-layer or clogging effect will become more apparent, particularly at the lower portion of the fibers where the positive membrane pressure created by pump 2 is the strongest. FIG. 7-B depicts a drastic condition that often occurs during the filtration process: the suspension actually contains particles which can effectively and completely occlude the "pores" of the filter. We will examine the effect on pore X (of FIG. 6) which is a single filter pore that can be situated on any location of a fiber. Fluids are flowing from the interior of pore X outwards until it is suddenly obstructed. Since resistance is complete with a perfect occlusion, flow outwards at pore X drops to zero. Pump 2 will continue to draw permeate but now the permeate comes from some other still open pores. At this time, the positive membrane pressure at pore X will effectively become zero. (Flow is equal to pressure gradient divided by resistance). However, the negative membrane pressure maintained by pump 1 is still in effect. Therefore, the unopposed negative membrane pressure created by pump 1 unplugs the pore X by promoting flow of fluid from the jacket into the interior of the fiber at location X. FIG. 7-C describes the inward and outward pressure relationships along the length of the fiber as "steady state" within the entire cartridge is reached. Actually for a given location or a certain "pore" on the fiber, the "steady state" is a constant fluctuation between outward flow and inward flow of the fluid. Every time the solid material occludes the membrane or forms a gel-layer where flow from the interior of the fiber outwards is impeded, the negative membrane pressure will take over to disperse that layer. Meanwhile, at a different site where the gel-layer has only begun to build, positive membrane pressure is fully at work to maximally extract the permeate. Thus the negative anti-clogging pressures are, by this design, most effective where obstruction to flux is the greatest while the positive membrane pressure works to extract permeate at locations where obstruction to flux is the least. This arrangement allows the membrane to be cleansed on a continuous basis and will not promote complete, irreversible occlusion of the filter or build-up of gel-layers.

Therefore, the present invention can be defined as an apparatus for filtering a suspension and increasing the concentration of retainable matter in the retentate, comprising: (a) a suspension holding means; (b) a suspension including particulate matter retained within said suspension holding means; (c) means for capturing permeate; (d) a filter means further comprising a housing having an inlet port, an exit port, at least one sidewall opening, and a filter membrane within the housing; (e) a first pump means; (f) a second pump means; (g) an interchangeable valve means; (h) means for interconnecting said first pump means, said second pump means, and said interchangeable valve means to said filter means, to said suspension holding means, and to said means for capturing permeate; (i) said first pump means and said second pump means each located downstream of said filter means; (j) said interchangeable valve means having a setting wherein said first pump means causes a portion of said suspension to be drawn out of said suspension holding means and run through said filter means without passing through said filter membrane and recirculated back into the suspension holding means while said second pump means causes a portion of said suspension to pass through said filter membrane to form permeate from the fluid phase of the suspension which has passed through said filter membrane and be drawn through said at least one sidewall opening in the filter housing and directed to said means for capturing permeate; and (k) said first pump means and said second pump means adjusted relative to each other such that the second pump means exerts a positive pressure on the suspension relative to the filter membrane to cause a portion of the fluid phase of the suspension to flow through the filter membrane and the first pump means exerts a negative pressure on the suspension relative to the filter membrane to cause a portoin of the suspension to flow through the filter means without passing through the filter membrane, such that as the portion of suspension passing through the filter membrane clogs a location of the filter membrane with particulate matter, the flow of the suspension which does not pass through the filter membrane creates a negative pressure relative to the filter membrane to pull the particulate matter away from the filter membrane and unclogs it.

Depending on the suspension, in some applications the negative pressure exerted on the suspension from said first pump means causes a retentate recirculation rate always greater than the volume reduction rate created by the positive pressure exerted on the suspension from said second pump means. In other applications, the positive pressure exerted on the suspension from said second pump means causes a volume reduction rate always greater than the retentate recirculation rate created by the negative pressure exerted on the suspension from said first pump means. In still other applications, the flow rates created by said first pump means and said second pump means are varied such that during part of the filtration process the retentate recirculation rate created by negative pressure exerted on the suspension from said first pump means is greater than the volume reduction rate caused by the positive pressure exerted on the suspension from said second pump means and during part of the filtration process the positive pressure exerted on the suspension from said second pump means results in a volume reduction rate greater than the retentate recirculation rate created by the negative pressure exerted on the suspension from said first pump means.

Defined more broadly, the present invention is an apparatus for filtering a suspension including particulates and increasing the retainable matter in the retentate, comprising: (a) means for retaining said suspension; (b) means for filtering said suspension including a filter membrane; (c) means for drawing suspension out of the means for retaining said suspension and causing the suspension to pass through said means for filtering said suspension, wherein the means exerts a negative pressure on the suspension relative to the filter membrane and causes the suspension to be drawn away from the filter membrane and pass through the filter means for recirculation back to the means for retaining said suspension; (d) means for exerting a positive pressure on the suspension relative to the filter membrane as the suspension is passed through the filter means to thereby cause a portion of the fluid phase of the suspension to pass through the filter membrane and create a permeate; and (e) adjusting the means for exerting a negative pressure on the suspension and the means for exerting a positive pressure on the suspension relative to each other such that as the portion passing through the filter membrane clogs a location of the filter membrane with particulate matter, the flow of the suspension which does not pass through the filter membrane creates a negative pressure relative to the filter membrane to pull the particulate matter away from the filter membrane and unclogs it.

The present invention is also defined as a method for filtering a suspension including particulate matter and increasing the concentration of retainable matter in the retentate, comprising: (a) causing said suspension to be drawn through a filter means whereby a portion of the suspension is recirculated through the filter means without passing through the filter membrane; (b) causing said suspension to be drawn through a filter means whereby a portion of the fluid phase of the suspension is passed through the filter membrane to create permeate; and (c) adjusting the flow of suspension which does not pass through the filter membrane and the portion of suspension which does pass through the filter membrane relative to each other such that as the portion passing through the filter membrane clogs a location of the filter membrane with particulate matter, the flow of the suspension which does not pass through the filter membrane creates a negative pressure relative to the filter membrane to pull the particulate matter away from the filter membrane and unclogs it.

The present invention is also defined as a method for dialysing a suspension including particular matter with or without concomitant reduction of the volume in which the particular matter is suspended.

The method of the present invention further involves a matching of the pressures to maximize the anti-clogging effect, wherein the location on the filter means having the greatest potential to clog due to positive pressure at the location is matched with the greatest negative pressure to most effectively unclog it to maintain a continuous process of anti-clogging filtration.

The method also includes a supplemental dialysis process for changing the composition of the fluid phase of the suspension. By infusing a fresh fluid different in composition to the permeate at a site near the inlet of the filtration means and causing the direction of flow of the fresh fluid to be concurrent to the direction of flow of the suspension, the composition of the fluid phase of the suspension can be changed, with and without concomitant reduction in volume of the suspension.

The method also includes a supplemental process for augmenting the negative pressure at locations of the filter means which are subjected to excessive positive pressure. Such excessive positive pressure is usually due to the length of the filter fibers in the filter means which doe snot allow adequate negative pressure at those locations to promote anti-clogging function. By infusing a fresh fluid similar in composition to the permeate at a site near the inlet of the filtration means and causing the direction of flow of the fresh fluid to be concurrent to the direction of flow of the suspension, additional negative pressure is applied to the locations with otherwise excessive positive pressures, to produce anti-clogging effects in those locations.

The method also includes dialysing the suspension with concomitant reduction in volume of the suspension, further comprising: (a) infusing a fresh fluid different in composition from the fluid phase of the suspension at a site near the inlet of the filtration means; (b) causing the rate of infusion of said fresh fluid to be less than the rate of permeate extraction from the suspension; and (c) causing the direction of flow of said fresh fluid to be concurrent to the direction of flow of the suspension.

The method also includes dialysing the suspension without concomitant reduction in volume of the suspension, further comprising: (a) infusing a fresh fluid different in composition from the fluid phase of the suspension at a site near the inlet of the filtration means; (b) causing the rate of infusion of said fresh fluid to be equal to the rate of permeate extraction from the suspension; and (c) causing the direction of flow of said fresh fluid to be concurrent to the direction of flow of the suspension.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A method for filtering a suspension including particulate matter and increasing the concentration of retainable matter in the retentate, comprising providing and alternative for substantially preventing clogging of a filter means with mechanical means, by:
   a. causing said suspension to be drawn through said filter means whereby a portion of the suspension is recirculated through the filter means without passing through the filter membrane;
   b. causing said suspension to be drawn through said filter means whereby a portion of the fluid phase of the suspension is passed through the filter membrane to create permeate; and
   c. adjusting the flow of suspension which does not pass through the filter membrane and the portion of suspension which does pass through the filter membrane relative to each other such that as the portion passing through the filter membrane clogs a location of the filter membrane with particulate matter, the flow of the suspension which does not pass through the filter membrane creates a negative pressure relative to the filter membrane to pull the particulate matter away from the filter membrane and unclogs it.

2. The method in accordance with claim 1 wherein the flow of suspension which does not pass through the filter membrane is always greater than the flow of the fluid phase of the suspension which does pass through the filter membrane.

3. The method in accordance with claim 1 wherein the flow of the fluid phase of the suspension which passes through the filter membrane is always greater than the flow of suspension which does not pass through the filter membrane.

4. The method in accordance with claim 1 wherein the flow of the fluid phase of the suspension which passes through the filter membrane and the flow of suspension which does not pass through the filter membrane are varied such that during part of the filtration process the flow of suspension which does not pass through the filter membrane is greater than the flow of the fluid phase of the suspension which does pass through the filter membrane and during part of the filtration process the flow of the fluid phase of the suspension which passes through the filter membrane is greater than the flow of suspension which does not pass through the filter membrane.

5. A method in accordance with claim 1 wherein the location on the filter means having the greatest potential to clog due to positive pressure at the location is matched with the greatest negative pressure to most effectively unclog it to maintain a continuous process of anti-clogging filtration.

6. A method in accordance with claim 1, further comprising:
   a. augmenting the negative pressure at locations of the filter means which are subjected to positive pressure which cannot be overridden by the negative pressure and therefore more readily clog, by infusing a fresh fluid at a site near the inlet of the filtration means; and
   b. causing the direction of flow of the fresh fluid to be concurrent to the direction of flow of the suspension.

7. A method in accordance with claim 1 for dialysing the suspension with concomitant reduction in volume of the suspension, further comprising:
   a. infusing a fresh fluid different in composition from the fluid phase of the suspension at a site near the inlet of the filtration means;
   b. causing the rate of infusion of said fresh fluid to be less than the rate of permeate extraction from the suspension; and
   c. causing the direction of flow of said fresh fluid to be concurrent to the direction of flow of the suspension.

8. A method in accordance with claim 1 for dialysing the suspension without concomitant reduction in volume of the suspension, further comprising:
   a. infusing a fresh fluid different in composition from the fluid phase of the suspension at a site near the inlet of the filtration means;
   b. causing the rate of infusion of said fresh fluid to be equal to the rate of permeate extraction from the suspension; and
   c. causing the direction of flow of said fresh fluid to be concurrent to the direction of flow of the suspension.

* * * * *